May 10, 1927. Re. 16,622

C. MEUNIER

GUTTER HANGER

Original Filed Jan. 25, 1923

WITNESSES

Otto Kiehn

Albert J. Clark

INVENTOR

Charles Meunier

BY

Munn & Co.

ATTORNEY

Reissued May 10, 1927. Re. 16,622

UNITED STATES PATENT OFFICE.

CHARLES MEUNIER, OF GREAT NECK, NEW YORK.

GUTTER HANGER.

Original No. 1,572,745, dated February 9, 1926, Serial No. 614,879, filed January 25, 1923. Application for reissue filed March 30, 1927. Serial No. 179,683.

This invention relates to gutter hangers, such as are utilized in connection with the supporting of gutters adjacent to the roofs of buildings, and more particularly aims to provide a self-clinching hanger relative to the longitudinal bead at a side edge of the gutter, which bead is generally at the outer side of the gutter. It should be understood, however, at the outset, that the invention is not necessarily to be limited to a gutter hanger embodiment solely adapted for use in connection with a beaded gutter of the type last mentioned. As will be hereinafter pointed out very clearly in the appended claims, the new hanger is susceptible to many apparently widely different embodiments from the preferred embodiment illustrated in the drawing.

It is an object of the invention to provide a device of the character described which is adapted to have portions not only for embracing the gutter bottom exterior, that is, for underlying or cradling the gutter, but also for straddling the top of the gutter trough and thus for bracing and further taking part in the support and rigidifying of the gutter. Otherwise stated, the kind of gutter hanger provided is of the well-known metallic strap type, including principally a longitudinal sub-division curved to act as a cradle for the bottom of the gutter, a longitudinal sub-division to act as a brace-bar overlying the top of the gutter, and a longitudinal sub-division shaped to embrace the gutter bead; in combination with a suspensory strip riveted or otherwise suitably secured at its lower end to the main strap aforesaid, usually at a point intermediate the length of the brace-bar. According to this well-known construction, the upper portion of the suspensory strip is suitably attached to an overlying cornice part of the roof over the cornice box, or otherwise, according to the architecture of the particular building being equipped with a gutter. As in previously suggested constructions of this kind, also, the hanger of the present invention has its gutter-engaging strap and suspensory strip preferably formed of a metal easily flexible yet strong and resistant to corrosive defects of the elements, such as sheet copper; especially where a copper gutter is to be mounted, to preclude any possibility of galvanic action between gutter and hanger.

The prime object of the invention will be most clearly understood by those skilled in the art, when it is stated that it is the aim to provide a hanger as above characterized, for use as above mentioned in connection with a gutter having its edge bead at its outer side, and of such a construction that the same, or more correctly, the gutter-embracing or main strap may be one-piece in construction, like the earlier and well-known Peerless hanger, and yet really clinchable on the gutter bead, like the later and equally well-known two-piece Rex hanger of the prior art.

An almost equally important object of the invention is thus to provide a novel structure of the kind just indicated, but one wherein the relatively high cost of manufacture of the Rex hanger is diminished considerably, the need for special or any tools at all for clinching the hanger to the gutter bead is eliminated, and hence there is provided a self-clinching hanger, and yet the new hanger will function when applied, and merely by hand, to grip the gutter bead more tightly and securely than heretofore and by a permanent seizure of practically the entire girth of the bead.

A rather important advantage incident to the preferred manner of carrying out the invention to attain the above objects, is the fact that a hanger is provided which may be stored and packed at a maximum saving of bulk, or such a saving at least equal to that permitted in the case of the Peerless and Rex hangers above mentioned.

In carrying out the invention to attain all the ends and advantages enumerated, the bead-clinching length of the unitary main strap is shaped and treated to establish an inherent but predeterminedly localized region of bend, or rather a plurality of such regions which have dissimilar and relatively graduated pronenesses to flexure, in combination with a shaping of the cradle-length of the main strap and the adjoining portion of the bead-clinching length to establish their meeting point as a sharp, stiff edge or corner, and to establish the cradle-length as a lever of gradually diminishing rigidity away from the fulcrum of the lever, which fulcrum, a floating one, is on said edge.

The invention will be more clearly understood from a reference to the accompanying drawing, showing the preferred embodiment aforesaid.

In this drawing, in which similar reference characters refer to similar parts throughout the several views.

Figure 1:
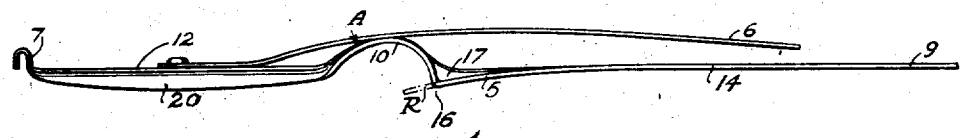
Fig. 1 shows the new hanger in side elevation, with its suspensory strip bent down flat closely to overlie the unitary main strap, as for storage or transportation.
Figure 2:
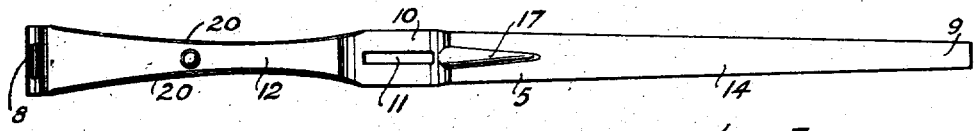
Fig. 2 is a bottom plan view of the hanger as arranged in Fig. 1.

For the benefit of these unacquainted with the above-mentioned Peerless and Rex hangers of the prior art, it may be explained that the Peerless hanger includes, like the present hanger, a main strap 5 and a riveted suspensory strip 6; and also, as to the main strap, a terminal transverse crimp 7, a slot 8 at the bottom of the latter for later receiving and resiliently engaging the other terminus 9 of the main strap, a bead-engaging arch 10, and a median longitudinal slot 11 at the arch. The Rex hanger is constructed like the Peerless hanger, but the former has its main strap made in two parts; one part providing the arch 10 and a length to the left of the arch and corresponding to the length 12 of Fig. 1, and the other part providing the length 14 to the right of the arch in said Fig. 1. The object of this special Rex construction was to provide a special inturned claw to wedge in between the inner under external periphery of the gutter bead and the contiguous exterior of the gutter proper, as per the dot-and-dash indication marked R, in Fig. 1. Where the two parts of the Rex main strap overlapped they were riveted together.

According to the present invention, however, an embodiment thereof, for instance that shown in the drawing, attains all the objects and advantages sought, by providing merely a one-piece main strap 5, and incorporating therein, preferably by a forming die, a shaping in the vicinity of the adjoining portions of arch 10 and length 14 and of the contiguous end of slot 11, as shown, thereby to establish at the point 16 as sharp a corner as good die design and the quality factor of the material of the blank will permit, and at the same time to establish a central rib or swell 17. This rib is preferably so associated with slot 11 and the surrounding and adjacent portions of the main strap 5, as to impart a number of special characteristics to the new hanger as contemplated by the invention. Thus, in the first place, the slot 11 preferably starting at the right of Fig. 1 at about the point indicated by the head of arrow A there is established a locale of maximum flexibility for the arch 10 running around the arch to the right from the left end of said slot, to a point intermediate the ends of the slot opposite the first slight beginning of rib 17. Therebeyond, still running around the arch to the right, the arch gradually diminishes in flexibility pursuant to the gradual rise in height and increase in lateral dimension of the rib. The point of maximum stiffness is reached at a point about opposite the sharp corner 16. Beyond this point for some distance the length 14 is of sufficient stiffness to convert the same in effect into a rigid lever; yet, at a suitable point, found to be ideal when located as shown in the drawing, and after a gradual diminution of stiffness along length 14 away from corner 16, the length 14 becomes fully restored to its usual high degree of flexibility.

As has heretofore been proposed, the length 12 of the main strap is provided with rigidifying side lips 20.

Figure 3:
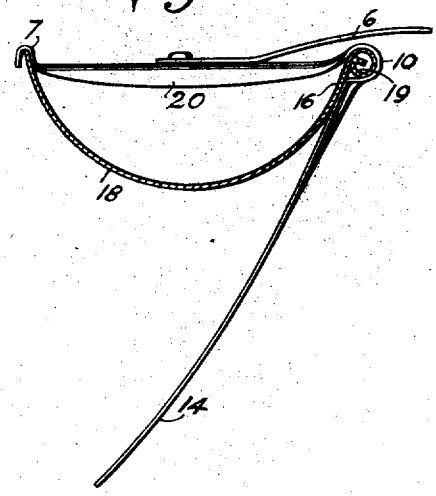
Fig. 3 is a side elevation illustrating the main strap of the hanger in course of being engaged with a gutter; such gutter being shown in transverse section.

In operation the new hanger is applied to the gutter entirely by hand, as follows: First, the length 1 is bent down out of the plane of length 12, as substantially perpendicular thereto, and the hanger is laid on the gutter 18 as shown in Fig. 3, that is, with the crimp 7 taking the inner unbeaded edge of the gutter and the arch 10 overlying the outer bead 19. Next, the lower portion of length 14 is grasped and pulled and swung toward the left as shown in Fig. 3; the corner 16 acting not only as a wedging device, but also as a floating fulcrum for the lever portion of length 14 at the rib 17. The zone of excessive bent coincident with about the mid-portion of arch 10, simultaneously and automatically wraps itself tightly around the contacted portion of the more or less resilient gutter bead 19; the corner 16 and such zone cooperating to self-clinch the hanger to the gutter,—which clinching is completed and made absolutely permanent as the result of a further bending of length 14 sufficiently to finally establish the same as a cradle element shown at 14′ in Fig. 4. Said length 14 is locked as such by drawing the terminus 9 of length 14 through slot 8 on crimp 7, and then bending such terminus down by hand as illustrated at 9′. The rigidifying side lips 20 of strip-length 12, especially when shaped adjacent the arch as shown, help considerably in constricting the neck of the contracted arch 10. It has been found that a one-piece hanger of the above construction may be applied instantly, and solely by hand as just described, and yet is absolutely accidentally immovable along the length of the gutter.

Figure 4:
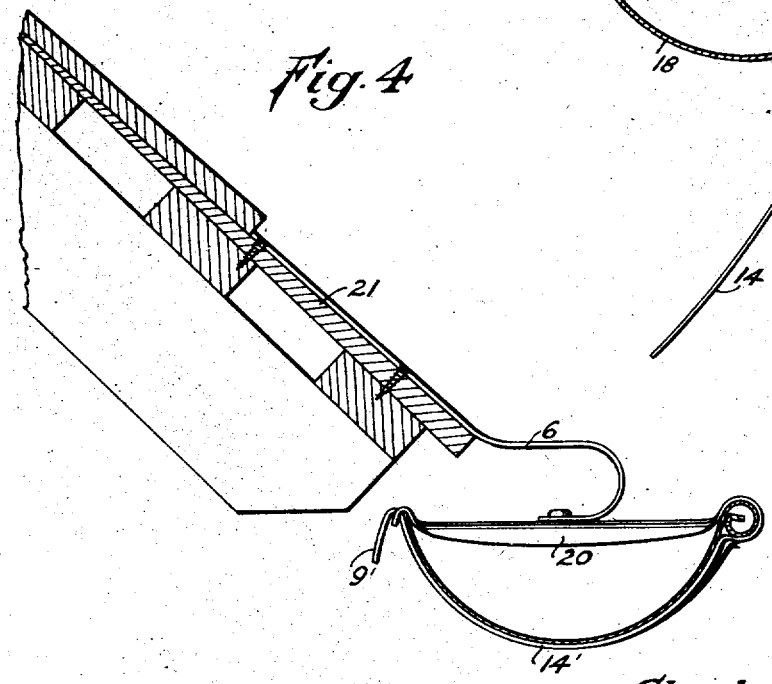
Fig. 4 is a view generally similar to Fig. 3, but showing the hanger completely applied and the gutter suspended from a roof by the suspensory strip.

Noting that the strip 6 may be used in any desired way for suspending each hanger from an overlying part of the building, for instance, by shaping the strip and screwing the free end thereof to a pitched shingle roof 21 as indicated in Fig. 4, it will be seen that there has been provided an embodiment of the invention truly a self-clinching one-piece structure, and one adapted to attain all the various ends and objects of the invention as hereinabove expressed and indicated.

Various slight changes might of course be made in the general form and arrangement of the parts described without departing from the invention, and hence I do not limit myself to the precise details stated, but consider myself at liberty to make such changes and alterations as fairly fall within the spirit and scope of the appended claims.

Having described my invention, I now claim:

1. A gutter hanger for use with a gutter having a beaded edge and comprising a strap having a rigid portion extending transversely between the upper edges of the gutter, said strap having a resilient arched portion at one end of said rigid portion, the resilient arched portion being designed to be bent to snugly fit around the bead of the gutter, said strap also having a cradle portion designed to underlie the gutter, the juncture of the cradle portion and the arched portion being relatively stiff and unyielding, and the cradle portion adjacent the juncture also being sufficiently stiff and unyielding to insure proper bending of the arched portion around and into snug engagement with the bead of the gutter when the cradle portion is moved up against the bottom of the gutter, the end of the cradle portion being engaged with the rigid portion.

2. A gutter hanger for use with a gutter having a beaded edge and comprising a strap having a rigid portion extending transversely between the upper edges of the gutter, said strap having a resilient arched portion at one end of said rigid portion, the resilient arched portion being designed to be bent to snugly fit around the bead of the gutter, said strap also having a cradle portion designed to underlie the gutter, the juncture of the cradle portion and the arched portion and the cradle portion adjacent the juncture being formed with a stiffening rib to insure proper bending of the arched portion around and into snug engagement with the bead of the gutter when the cradle portion is moved up against the bottom of the gutter, the end of the cradle portion being engaged with the rigid portion.

3. A gutter hanger for use with a gutter having a beaded edge and comprising a strap having a rigid portion extending transversely between the upper edges of the gutter, said strap having a resilient arched portion at one end of said rigid portion, the resilient arched portion being designed to be bent to snugly fit around the bead of the gutter, said strap also having a cradle portion designed to underlie the gutter, the juncture of the cradle portion and the arched portion and the cradle portion adjacent the juncture being formed with a stiffening rib to insure proper bending of the arched portion around and into snug engagement with the bead of the gutter when the cradle portion is moved up against the bottom of the gutter, said stiffening rib being largest and strongest at the juncture and being of gradually decreasing size and strength as it extends along the cradle portion, the end of the cradle portion being engaged with the rigid portion.

CHARLES MEUNIER.